July 12, 1938.  C. R. WASEIGE  2,123,219
DRIVING MECHANISM
Filed March 18, 1936
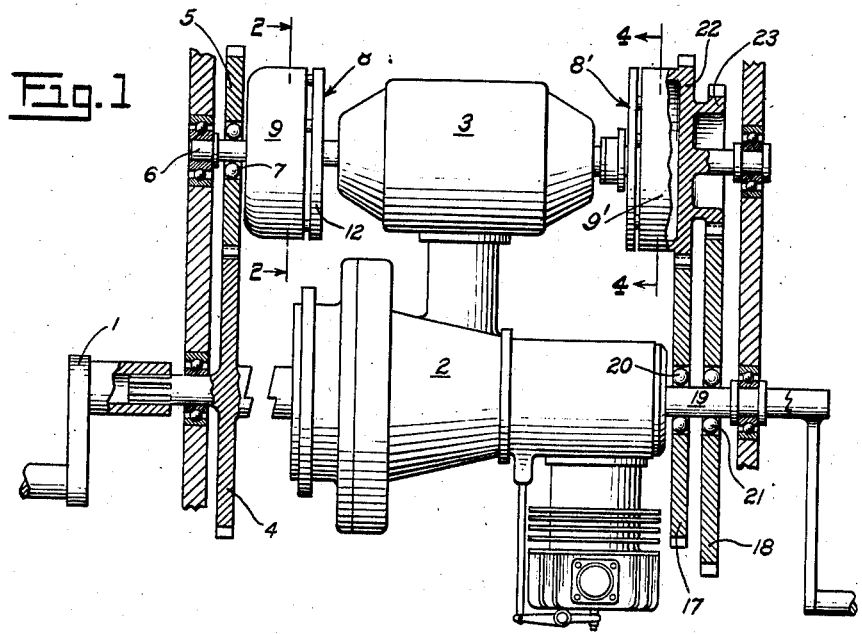
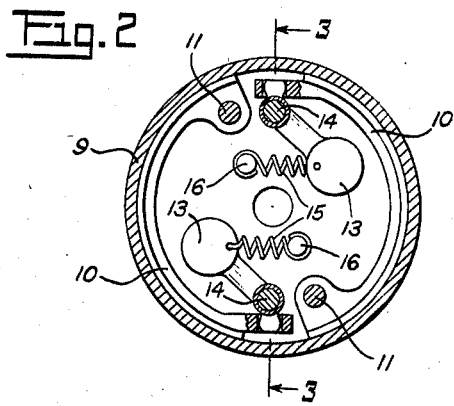
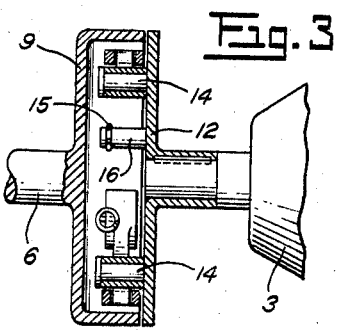
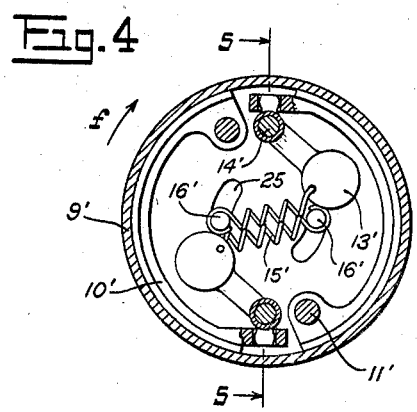
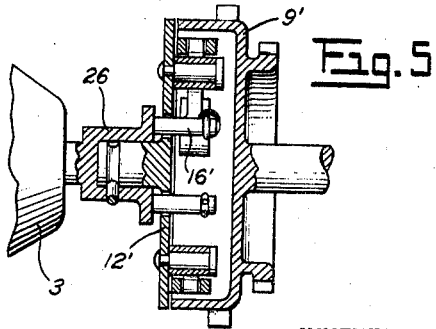
INVENTOR.
Charles Raymond Waseige
BY McConkey & Smith
ATTORNEYS Patented July 12, 1938

2,123,219

UNITED STATES PATENT OFFICE 2,123,219

DRIVING MECHANISM

Charles Raymond Waseige, Rueil-Malmaison, France, assignor to Societe Anonyme Air Equipment, Billancourt, Seine, France, a society of France Application March 18, 1936, Serial No. 69,558
In France March 29, 1935

4 Claims. (Cl. 60—97)

Aircraft usually have on board an electric generator of the direct or alternating current type which is driven by the aircraft motor itself. When the motor stops, current will no longer be supplied for the various needs, such as wireless operation and lighting.

The object of the present invention is to assure the constant operating of one or more accessory apparatus when the propelling motor is not in use, and chiefly to assure the constant supply of the necessary current, without requiring the use of a storage battery or of an auxiliary apparatus, and preferably with the sole use of the accessories usually employed with the aircraft motor, i. e. starting motor and generator, without making it necessary to add any other accessory part.

Thus the present invention essentially consists in a special combination of at least three apparatus, that is, a propelling motor for the aircraft, an auxiliary motor, and one or more accessories such as an electric generator, a vacuum or liquid pump, a winch, or the like, and the said combination is chiefly characterized by the fact that the accessory device, which is connected to the propelling motor by transmission gear through which it is driven by the said motor, is also connected to the auxiliary motor, it being preferably combined at the same time with means enabling its use for starting the propelling motor, by means of other transmission gear through which the said auxiliary motor may also drive the same.

In all such cases, it is advantageous, and this is also comprised in the invention, to provide means which assure, if the propelling motor should stop, the automatic starting of the auxiliary motor, by utilizing for this purpose the kinetic energy of at least one of the apparatus which were in operation, that is, the propelling motor and the accessory.

On the other hand, chiefly due to the requirements of the wireless apparatus, it is advantageous to include in the transmission gear between the generator and the two motors, suitable friction clutches whose friction pressure is variable and is controlled by a centrifugal device, thus assuring the operation of the generator at constant speed, irrespectively of the speed variations of the driving motor.

The mechanical constructions for the combination which form the essential object of the present invention may have a great diversity. By way of example, the accompanying drawing represents three different combinations in which the auxiliary motor is used to start the propelling motor, and the generator is the accessory which is directly driven by the auxiliary motor. These constructions offer certain particular features which will be further set forth in the way of secondary details of the present invention.

Fig. 1 is a diagrammatic view of an embodiment of the invention.

Fig. 2 is a section on the line II—II of Fig. 1.
Fig. 3 is a section on the line III—III of Fig. 2.
Fig. 4 is a section on the line IV—IV of Fig. 1.
Fig. 5 is a section on the line V—V of Fig. 4.

In all of these figures, 1 indicates the crankshaft of the main motor; 2 is the auxiliary motor of the explosion or the internal combustion type, 3 and 3' are two accessory parts, and chiefly a generator 3 of the direct or alternating current type.

In the form of construction shown in Fig. 1, the crankshaft is coupled at its end to a gearwheel 4 engaging a like wheel 5 mounted on a shaft 6, with the interposition of a free wheel 7, of a conventional type, such as is illustrated at k in Patent No. 1,962,706 granted to Albert Callsen et al. on June 12, 1934, and operating in such a manner that the driving connection between the normal driving part and the normal driven part is effective to transmit torque only so long as the former is rotated faster than the latter, there being but a single direction of rotation under all conditions. The shaft 6 is connected with a friction coupling device of the friction type whose coupling power is automatically variable according to the speed of the driven part, in this case the generator 3, which coupling device is designated as a whole by 8. The said coupling device herein consists of a drum 9 secured to the shaft 6, and in its interior are located the brake shoes 10 of the progressive friction type. The said shoes are pivotally mounted on axles 11 secured to a disc 12 which is keyed to the shaft of the generator 3. The said disc also carries the movable heavy balls 13, which in this case are connected to the shoes 10 in such a way that their displacement by centrifugal force will tend to separate the shoes from the drum 9, against which they are pressed by springs 15, these being preferably traction springs located between the balls 13 and the attaching members 16 secured to the disc 12.

On the other hand, the connection between the generator 3, which has two projecting shaft ends, and the starting device 2, is assured in this case by two sets of gearing 17 and 18, of different diameters, which are mounted on the shaft of the starting device through the medium of free wheels 20 and 21 corresponding in structure and mode of operation to the free wheel 7 previously described, and which respectively engage two coaxial wheels 22 and 23, which rotate together and are connected with the second projecting end of the generator shaft by means of a friction coupling 8' of the same type as the coupling 8. The free wheels 20 and 21 are so arranged that the wheel 20, forming part of the gearing having the lesser ratio, will provide the driving connection between the wheel 17 and the shaft 19 of the starter 2 when this shaft becomes the driving shaft; the other wheel 21 assures the connection between the wheel 18 and the shaft 19 when the wheel becomes the driving part. This drive between the starter 2 and the generator 3 is completed by a clutching and release mechanism which will eliminate the driving connection between the wheel 23 and the generator when this wheel 23 tends to drive the wheel 18, as it does at the normal running speed of the main engine gears 4 and 5 which normally drive the generator 3. The said mechanism comprises centrifugal balls which are operated by the generator and which act in such way that this connection will again be made when the centrifugal force acting upon the balls drops below a determined value. In the present case, the said clutching mechanism is combined in the following manner with the friction coupling adapted for variable slip. The wheels 22 and 23 are mounted on the friction drum 9' of the said coupling 8' whose shoes 10' and balls 13' are mounted respectively on axles 11' and 14' secured to a disc 12' loosely mounted on a sleeve pertaining to the generator 3. The attaching points of the springs urging the said balls consist of spindles which are inserted into the drum 9' through apertures 25 in the disc 12' and are supported, outside of the drum 9', by the sleeve 26 of the generator shaft.

It will be noted that the tension of the springs 15' will be different according as the spindles 16' are in contact with one end or the other of the grooves 25, and this will vary the value of the couple which the clutch is able to transmit, without slipping, for a given speed, or otherwise stated, its capacity at this speed. It will thus be observed that the uncoupling may be automatically effected when the sleeve 26 is driving, and this at a rate of rotation at which the uncoupling will not take place when the disc 12' is driving. It is advantageous, for the proper working of the mechanism, that the line of action of each spring 15' shall proceed very near to the axis of rotation when the corresponding spindle 16' is in the position for the maximum coupling capacity.

The operation of the aforesaid apparatus is as follows:

The three devices being stopped and the auxiliary motor 2 started, the free wheel 20 is held fast, and thus the shaft 19 rotates the gear-wheels 17—22 and hence the drum 9' secured to the wheel 22; the drum rotates in the direction *f*, while the wheel 18 turns loose on the axle 19, due to the free wheel 21. The shoes 10' are in placed contact with the drum 9' by the action of the springs 15', thus rotating the disc 12', and the spindles 16' will assume the position shown in Fig. 4, which is that of the maximum coupling capacity. The generator 3 is thus driven by the auxiliary 2, and the generator actuates, by its second shaft end, the coupling 8 whose drum 9, which now drives the free wheel 7, turns free without driving the wheel 5.

According as the speed of the generator 3 increases, the balls 13' will separate under the action of the centrifugal force, and will tend to separate the shoes 10' from the drum 9', and thus a greater or less slip will take place between this drum and the disc 12', and this will bring the speed of the disc to a practically constant rate, while the speed of the drum 9' will exceed this rate by an amount which may be considerable and may vary without affecting the speed of the disc 12'.

When the auxiliary motor 2 and the motor used for the propulsion of the aircraft are coupled together in order to start (conventional coupling means being provided for the purpose, one such coupling device being indicated at 29, 30 and 58 in the drawings of Patent No. 1,764,893 granted to W. F. Rothermund on June 17, 1930, and another in Patent No. 1,660,953 granted to Roland Chilton on February 28, 1928) and when the aircraft is in motion, the gearing 4—5 rotates, and when the speed of the wheel 5 exceeds that of the shaft 6, the free wheel 7 will be jammed, and the crankshaft 1 becomes the part driving the generator 3 by means of the coupling 8 which limits the speed of the generator to a constant value, as set forth with reference to the similar device 8'.

Due to the fact that the driving is effected by crankshaft 1, the sleeve 26 becomes a driven part with reference to the disc 12', and the spindles 16' will move in the grooves 25 in order to assume the position of minimum coupling capacity. Under the action of the centrifugal force, the balls 13' become further separated from the centre, and break the contact between the shoes 10' and the drum 9', thus cutting off the driving connection between the generator 3 and the auxiliary motor 2 which continues to rotate or which has been stopped in the meantime.

If when the auxiliary motor 2 has been stopped, the crankshaft 1 should stop, or if its speed should fall to an insufficient value to drive the generator at the proper speed, the generator will slow down, and the balls 13' will come nearer the centre, and this brings the shoes 10' into contact with the drum 9', and the latter is thus driven. It actuates the wheels 22 and 23, which then turn the wheels 17 and 18. The wheel 17 thus turns on the axle 19, due to the loose wheel 20; the loose wheel 21 is held fast, thereby transmitting torque to the shaft 19 and hence starting the auxiliary motor 2.

It will thus be observed that in this form of construction, when the auxiliary motor 2 is set running, this will operate the accessory parts 3, and when the motor propelling the aircraft is started and has a sufficient speed, these accessory parts are automatically driven by this propelling motor. Inversely, when the speed of the motor falls below a certain limit, it automatically assures the starting of the auxiliary motor. If the propelling motor should suddenly stop before it has had time to start the auxiliary motor, this latter is started by means of the inertia of the generator.

I claim:

1. The combination with a pair of internal combustion engines, of a work performing unit associated therewith, separate driving means interposed between each of said engines and said work performing unit, and means responsive to the transfer of torque to said unit by way of one of said separate driving means to cause the other of said separate driving means to remain in non-driving condition.

2. The combination with a pair of internal combustion engines, of a work performing unit associated therewith, separate driving means interposed between each of said engines and said work performing unit, one of said driving means including a gear having two sets of teeth, one set for transmitting torque from one engine to the work performing unit, and the other set constituting the driven element of a clutch through which starting energy is transferred from one engine to the other.

3. The combination with a work performing unit, of a pair of centrifugal clutches, each having elements rotatable with said unit, means operating through one of said clutches for rotating said unit at a predetermined speed, and means operating through the other of said clutches for rotating said unit at a higher speed, and thereby causing said first named clutch to move to the non-driving position.

4. The combination with a work performing unit, of a pair of centrifugal clutches, each having elements rotatable with said unit, an internal combustion engine operating through one of said clutches for rotating said unit at a predetermined speed, and a second internal combustion engine operating through the other of said clutches for rotating said unit at a higher speed, and thereby causing said first named clutch to move to the non-driving position, and means for coupling said internal combustion engines to cause transfer of starting energy from one to the other.

CHARLES RAYMOND WASEIGE.